April 8, 1969 J. M. MADER 3,437,943
SYNCHRONIZED MODULATOR-DEMODULATOR SYSTEM
Filed March 16, 1965
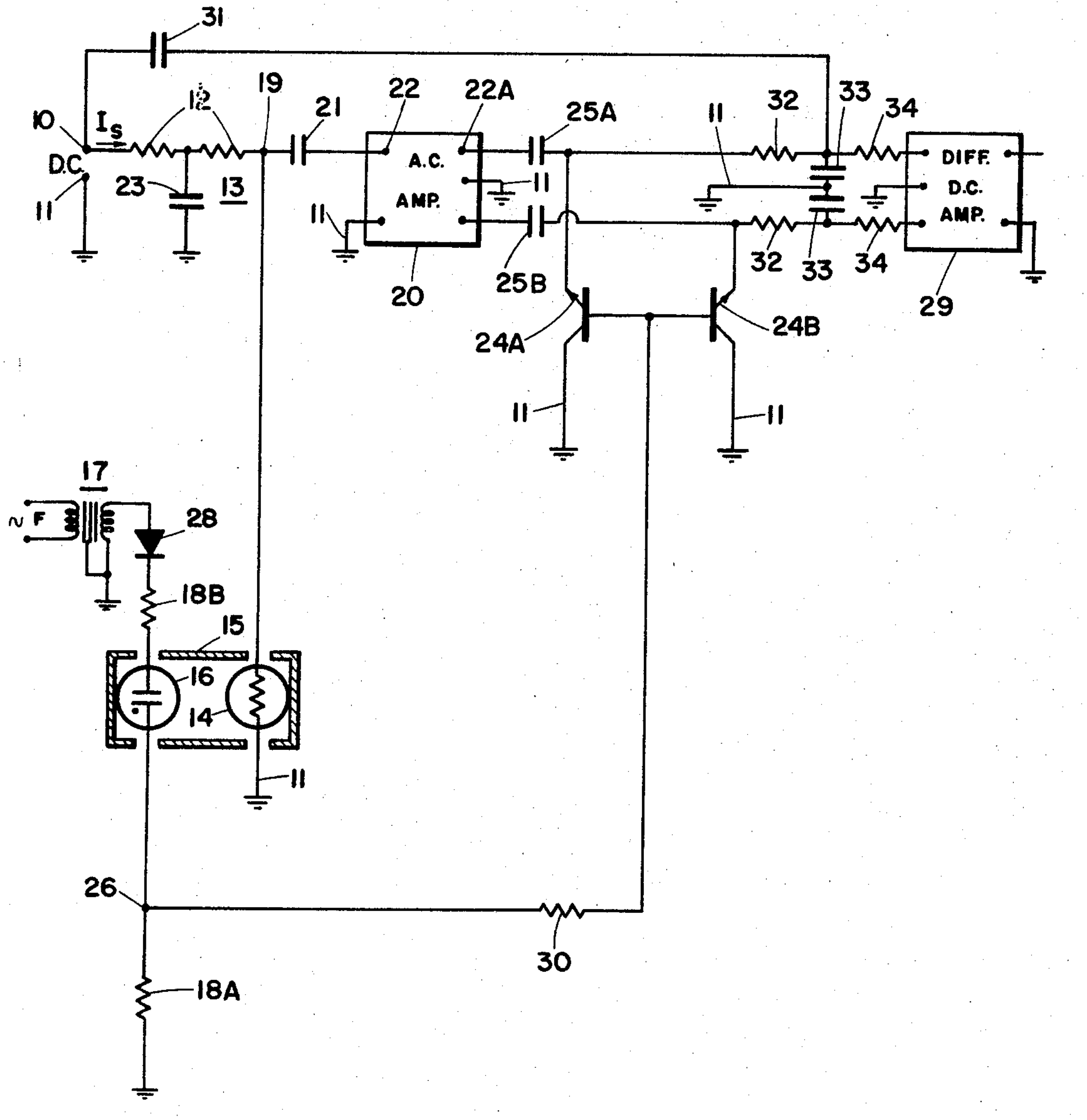

United States Patent Office 3,437,943

Patented Apr. 8, 1969

3,437,943
SYNCHRONIZED MODULATOR-DEMODULATOR SYSTEM

James M. Mader, Lansdale, Pa., assignor to Leeds & Northrup Company, Philadelphia, Pa., a corporation of Pennsylvania Filed Mar. 16, 1965, Ser. No. 440,180
Int. Cl. H03f 3/38, 17/00
U.S. Cl. 330—10 2 Claims

ABSTRACT OF THE DISCLOSURE

A synchronized modulator-demodulator system in which the DC input circuit of an AC amplifier includes a photosensistive device and in which the output circuit of the AC amplifier includes a solid-state switch triggered by the voltage drop across resistance means in series with a neon bulb which periodically illuminates the photosensitive device.

This invention relates to amplifier systems of the type in which a low-level DC signal is modulated for amplification by an AC amplifier whose output is demodulated to provide a high-level DC signal.

In accordance with the present invention, the signal modulator comprises photoconductive means included in the input circuit of the amplifier and periodically illuminated by a gas-discharge tube; and the signal demodulator in the output circuit of the amplifier comprises solid-state switching means which is triggered by the voltage drop periodically produced by resistance means in circuit with the gas-discharge tube of the modulator.

The invention further resides in amplifier systems having new and useful features of combination and arrangement hereinafter described and claimed.

For a more detailed understanding of the invention, reference is made to the following description and drawing of a preferred embodiment thereof.

In the amplifier arrangement shown in the drawing, the terminals 10, 11 are for connection to a source of low-level DC signal of either polarity and of variable magnitude representative, for example, of the existing magnitude of temperature, pressure or other variable under measurement; or of the deviation of such variable from a set-point; or of the unbalance between such signal and the reference. Specifically, the terminal 10 may be a summing point to which are supplied opposing unidirectional currents respectively of unknown and known values. The unidirectional signal current flows in a series-circuit including the resistors 12 of an RC filter circuit 13 and the photoconductive device 14 which may be a phototransistor, a photodiode or preferably, as shown, a photosensitive resistance device such as a cadmium cell.

The photoconductor 14 is within a suitable shield 15 to protect it from ambient light and stray electric fields. The photoconductor is periodically illuminated by light from the gaseous-discharge tube 16 which may, for example, be a neon bulb. A periodic firing voltage for bulb 16 may be derived from a suitable AC power source, for example, a 60-cycle, 110-volt line as via an isolation transformer 17 and rectifier 28. The peak output voltage of the secondary of transformer 17 is suitably in excess of the firing or ionizing potential of the gas of bulb 16. The total value of the resistance means comprising resistors 18A, 18B is chosen to limit to a safe value the current flowing through bulb 16 when fired.

For each positive half-wave of the supply line frequency F, the tube 16 is fired when the rising secondary voltage passes through the ionizing value of its gas, and the resulting current continues to flow through the tube until later in the half-cycle when the half-voltage drops below the value required to maintain the arc discharge. In consequence of the periodic illumination of the photoconductor 14, the resistance of the signal circuit between point 19 and the common terminal or reference point 11 periodically varies over a wide range at frequency F, so to modulate any DC signal current flowing through the aforesaid signal path.

The AC component of the modulated signal is applied to the input circuit of the AC voltage amplifier 20 which may be of high-gain, narrow band-pass type. The DC component of the modulated signal is excluded from the input circuit of amplifier 20 by suitable isolating or blocking means, such as a transformer or, as shown, by a blocking capacitor 21 connected between point 19 of the signal current circuit and the ungrounded input terminal 22 of amplifier 20.

The magnitude of the relatively high-level AC output signal of amplifier 20 as appearing between either of output terminals 22A, 22B and the common or ground terminal 11 is a function of or proportional to the magnitude of the DC input signal. To convert the AC output signal to a high-level DC signal, each output circuit is shunted by a corresponding one of the solid-state switches 24A, 24B which is periodically switched between its ON and OFF states by trigger pulses derived from flow of current in the modulator circuit including the gas-discharge tube 16.

Preferably, and as shown, the switches 24A, 24B are transistors having their internal emitter-collector resistance connected across the corresponding AC output circuit of amplifier 20. The capacitors 25A, 25B, or other isolating means such as transformers, are used to isolate the transistors 24A, 24B from DC operating voltages for the output stage of the amplifier. The base of each of transistors 24A, 24B is connected to the ungrounded terminal 26 of resistor 18A via resistor 30. The value of resistor 18A is so chosen that the voltage drop across it when the gas-discharge tube is conductive suffices to switch the demodulator transistors 24A, 24B to their ON state: the value of resistor 30 is chosen to prevent excessive overdrive of the transistor. For the intervals when neon tube 16 is dark, no current flows through resistor 18A, and consequently, the transistors 24A, 24B revert or switch back to their OFF state for lack of base current. It is to be noted that with this arrangement, the interval for which the demodulator in the output circuitry of amplifier 20 is switched OFF very closely corresponds with the interval for which the photoconductor of the modulator is illuminated. A greater or lesser interval introduces error in relationship between the demodulated output signal and the applied DC input signal.

In the particular system shown in the drawing, the demodulated output of amplifier 20 is supplied to the differential input of a DC operational amplifier 29 whose DC output signal may be used in analog computations. For high-speed computation, capacitor 31 is connected between the DC signal terminal 10 and one of the input circuits of amplifier 29: it may be omitted for low-speed computation where a narrower band-pass suffices. The resistor 32 and capacitor 33 in each of the output circuits of amplifier 20 provide an RC filter network and the associated resistor 34 provides isolation of the filter capacitor from the input of amplifier 29.

Suitable circuit parameters and components for the modulator-demodulator systems shown are set forth in Table A below.

*Table A*

| | | |
|---|---|---|
| Tube **16** | | G.E. NE-2U |
| Photoconductor **14** | | Clairex C1-703-C1 |
| Transistors **24A**, **24B** | | 2N3391A |
| Rectifier **28** | | CER-69 |
| Transformer **17**, v. output | | 110 |
| Resistors: | | |
| **18A** | | 10K |
| **18B** | | 27K |
| **30** | | 5.6K |
| **12**, **12** | | 270K |
| **32** | | 100K |
| Capacitors: | | |
| **21** | μf | 0.1 |
| **23** | μf | 0.1 |
| **25**, **25** | μf | 1.0 |
| **31** | μf | 3 |

What is claimed is:

1. A synchronized modulator-demodulator arrangement for an AC amplifier comprising photosensitive means in the signal-input circuit of said amplifier, a gaseous-discharge tube disposed to illuminate said photosensitive means, pulsating DC current-supply means for periodically firing said gaseous-discharge tube so to modulate the input signal to said amplifier, solid-state switching means in the signal-output circuit of said amplifier, resistance means traversed by the periodic current of said gaseous-discharge tube, and a DC connection between said resistance means and said solid-state switching means to turn it ON and OFF for intervals closely corresponding with the intervals of periodic illumination and nonillumination of said photosensitive means by said gaseous-discharge means.

2. A synchronized modulator-demodulator arrangement as in claim 1 in which the solid-state switching means comprises a transistor having said resistance means in its base circuit.

References Cited

FOREIGN PATENTS 623,782 2/1963 Belgium.

971,738 10/1964 Great Britain.

NATHAN KAUFMAN, *Primary Examiner.*

U.S. Cl. X.R.

330—12, 59